(12) United States Patent
Stensrud

(10) Patent No.: US 6,528,446 B1
(45) Date of Patent: Mar. 4, 2003

(54) PROCESS FOR MAKING CLAY SPHEROIDS

(75) Inventor: James C. Stensrud, Grand Rapids, MN (US)

(73) Assignee: Kinetico Incorporated, Newbury, OH (US)

( * ) Notice: Subject to any disclaimer, the term of this patent is extended or adjusted under 35 U.S.C. 154(b) by 0 days.

(21) Appl. No.: 09/678,583

(22) Filed: Oct. 3, 2000

(51) Int. Cl.$^7$ .......................... C04B 33/04; C04B 35/01; C04B 35/626; C04B 35/632

(52) U.S. Cl. ........................ 501/148; 501/140; 501/142; 501/150; 501/153; 501/154

(58) Field of Search ................................ 428/402, 331; 501/140, 142, 148, 150, 153, 154

(56) References Cited

U.S. PATENT DOCUMENTS

| | | | |
|---|---|---|---|
| 4,039,480 A | * 8/1977 | Watson et al. | 252/455 R |
| 4,280,845 A | * 7/1981 | Matsushisa et al. | 106/62 |
| 4,295,892 A | * 10/1981 | Matsushisa et al. | 501/120 |
| 4,434,239 A | * 2/1984 | Aitcin | 501/118 |
| 4,632,876 A | 12/1986 | Laird et al. | |
| 4,725,390 A | * 2/1988 | Laird et al. | 264/62 |
| 5,512,523 A | * 4/1996 | Ono et al. | 501/127 |
| 6,210,625 B1 | * 4/2001 | Matsushita et al. | 264/610 |

OTHER PUBLICATIONS

Oreskovich et al., "Testing of Kittson County Bloating Clays as Lightweight Aggregate In Structural Concrete," Natural Resources Research Institute, University of Minnesota (1993).

Oreskovich et al., "Preliminary Testing and Pilot–Scale Processing of the Kittson County Bloating Clays," National Resources Research Institute, University of Minnesota (1997).

Hauck, "Ceramic Title and Lightweight Aggregate Product Development Using Minnesota Clays," Natural Resources Research Institute (1993).

* cited by examiner

Primary Examiner—H. Thi Le
(74) Attorney, Agent, or Firm—Watts, Hoffmann, Fisher & Heinke Co.

(57) ABSTRACT

A process of making ceramic spheroids by firing clay spheroids comprising by weight percent: FeO (3.22–5.21), $Fe_3O_4$ (3.40–5.11), $SiO_2$ (52.49–59.42), CaO (1.99–7.96), MgO (2.81–4.69), $Al_2O_3$ (12.05–17.65), $TlO_2$ (0.58–0.71), MnO (0.07–0.19), $Na_2O$ (0.47–0.86), $K_2O$ (1.70–2.37), $P_2O_3$ (0.13–0.19), S (0.03–0.29), $CO_2$ (0.90–8.23), Organic C (0.22–1.04), $H_2O+$ (4.14–7.28), $H_2O-$ (2.12–5.48) in contact with a particulate parting agent selected from aluminum oxide, magnesium oxide, and their precursors at a sufficiently high temperature and for a sufficiently long time to form a shell. Preferably, the clay spheroids are obtained from a deposit located at Hallock in Kittson County Minn., U.S.A.

16 Claims, 2 Drawing Sheets

US 6,528,446 B1

PROCESS FOR MAKING CLAY SPHEROIDS

TECHNICAL FIELD

The invention is related to clay spheroids having utility, among others, as filter media, odor barrier media, and filler for low density plastics.

BACKGROUND

Commercially available lightweight spheroids for use as filter media and the like include low density ceramic particles such as cellulated glass particles and fired ceramic particles. U.S. Pat. No. 4,725,390 to Laird et al. concerns a process for making fired ceramic spheroids that are currently sold under the trademark Macrolite®. Advantages of the Macrolite® spheroids include the ability to adjust the specific gravity of the spheroids so that they will either sink or float indefinitely, the strength of the spheroids, and the capability to produce the spheroids in a wide range of sizes.

The specific gravity of spheroids can be a critical property. Specific gravity is the ratio of the mass of a body to the mass of an equal volume of water at a specified temperature. Specific gravity gives an indication of how buoyant media will be in water. For example the specific gravity of Macrolite® ranges from 0.58 grams per cubic centimeter (which floats on water) to 2.05 grams per cubic centimeter (which sinks in water). U.S. patent application Ser. No. 08/807,137 now abandoned, incorporated herein by reference, discloses a filter that can be constructed using Macrolite® spheroids. The specific gravity of the spheroids is adjusted to control the backwashing rate of the filter to allow optimum particle removal without blowing media into lines above the filtration tank. U.S. patent application Ser. No. 09/361,716, incorporated herein by reference discloses a gradiated filter that uses spheroids of varying specific gravities so that the spheroids will settle into a desired layered pattern at installation and after backwashing. A related concept to specific gravity is bulk density. Bulk density is the concentration of matter, measured by the mass per unit volume, such as pounds per cubic foot. Bulk density is often used a proxy for specific gravity because it is easier to measure. In general, lower bulk density corresponds to a lower specific gravity.

In order to control the specific gravity of the spheroids in their manufacture, the process of U.S. Pat. No. 4,725,390 incorporates 0.1 to 50 parts by weight silicon carbide, an expanding agent, into the core of the spheroid. In a process known as prilling, the silicon carbide is mixed with mineral particulates and a binder to form unfired spheroids which are sorted by size and dried. The dried spheroids are then mixed with a surface metal oxide such as aluminum oxide. The metal oxide serves as a parting agent and may also provide electrical properties that attract particulate matter that a filter is designed to remove from a liquid, see U.S. patent application Ser. No. 09/235,202, incorporated herein by reference.

In the firing stage, the dried spheroids are heated in a kiln at a temperature ranging from about 1080 to 1200° C. The temperature and length of firing are controlled to adjust the specific gravity of the spheroids. In general, the higher the temperature and longer the firing the more trapped oxidized silicon carbide gas becomes present in the spheres, lowering their specific gravity. While the Macrolite® has enjoyed great commercial success, it is desirable to produce spheroids at a lower cost using simpler manufacturing methods to provide an economical ceramic spheroid.

SUMMARY OF THE INVENTION

The present invention provides economical spheroids using a relatively simple manufacturing method. The present invention eliminates the need for mixing the expanding agent silicon carbide with mineral particulates to obtain raw spheroids for firing. Clay for the spheroids is obtained that expands when heated, without the need for additional expanding ingredients. The raw spheroids of clay can be shipped to the firing location already sorted by size and fired to obtain fired spheroids. Because the clay expands when heated, the specific gravity of the fired spheroids can be adjusted by varying the firing conditions.

The present invention provides a process of making ceramic spheroids comprising the step of firing clay spheroids comprising by weight percent: FeO (3.22–5.21), $Fe_3O_4$ (3.40–5.11), $SiO_2$ (52.49–59.42), CaO (1.99–7.96), MgO (2.81–4.69), $Al_2O_3$ (12.05–17.65), $TiO_2$ (0.58–0.71), MnO (0.07–0.19), $Na_2O$ (0.47–0.86), $K_2O$ (1.70–2.37), $P_2O_3$ (0.13–0.19), S (0.03–0.29), $CO_2$ (0.90–8.23), Organic C (0.22–1.04), $H_2O+$ (4.14–7.28), $H_2O-$ (2.12–5.48) in contact with a parting agent comprising a particulate selected from aluminum oxide, magnesium oxide, and their precursors at a sufficiently high temperature and for a sufficiently long time to form a shell.

In an exemplary embodiment of the present invention, the clay spheroids are obtained from a deposit located at Hallock in Kittson County Minn., U.S.A. The fired ceramic spheroids have a fired bulk density ranging from about ten to fifty pounds per cubic foot, however variations in process parameters may produce spheroids outside this bulk density range. The firing temperature is between 1080° C. and 1200° C.

In another embodiment of the present invention, the clay of the above described spheroids is used as an expanding agent with other mineral particulates, and can serve a similar function to the silicon carbide that is used in the manufacture of currently available spheroids.

Further advantages and a fuller understanding of the invention will be had from the accompanying drawings and the detailed description of the invention.

DETAILED DESCRIPTION OF THE PREFERRED EMBODIMENT

Figure 1:
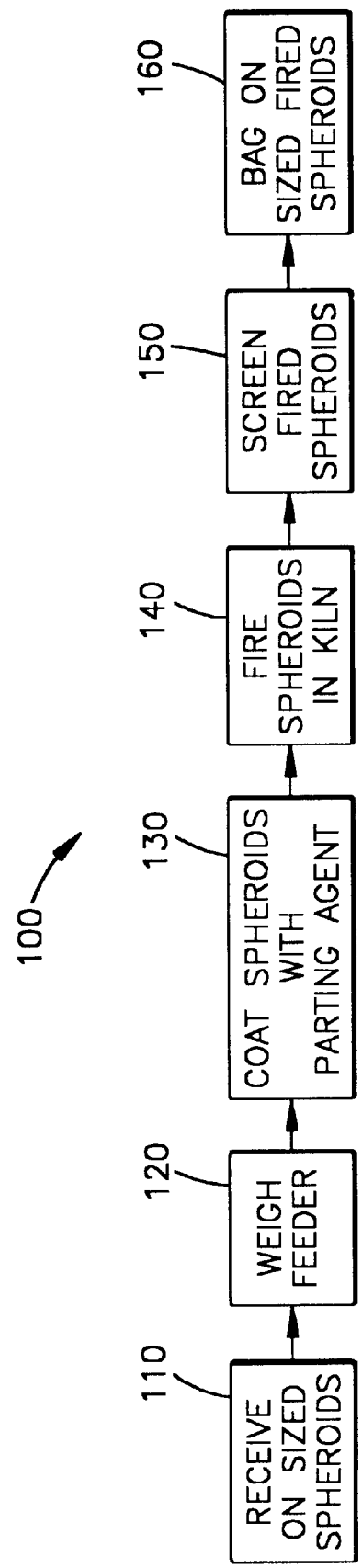
FIG. 1 illustrates, for a preferred embodiment, a flow diagram of a process for making clay spheroids in accordance with the present invention.

Referring to FIG. 1, a process for making clay spheroids 100 is depicted. In step 110, dry on sized clay spheroids are obtained having the following geochemical composition:

| Geochemical Component | Percent by Weight |
|---|---|
| FeO | 3.22–4.84 |
| $Fe_3O_4$ | 3.40–5.11 |
| $SiO_2$ | 52.49–55.69 |
| CaO | 2.89–6.74 |
| MgO | 3.21–4.69 |
| $Al_2O_3$ | 11.91–17.65 |
| $TiO_2$ | 0.59–0.71 |
| MnO | 0.07–0.11 |
| $Na_2O$ | 0.47–0.86 |
| $K_2O$ | 1.99–2.37 |
| $P_2O_3$ | 0.13–0.19 |

-continued

| Geochemical Component | Percent by Weight |
| --- | --- |
| S | 0.16–0.29 |
| $CO_2$ | 1.80–6.23 |
| Organic C | 0.26–1.04 |
| $H_2O+$ | 4.14–7.28 |
| $H_2O-$ | 2.12–5.48 |

It is believed that FeO, $Fe_3O_4$, S, and Organic C are of relative importance to the expanding property of the clay. In an exemplary embodiment, the dry on sized clay spheroids are obtained from a deposit located at Hallock in Kittson County, Minn.

The dry spheroids are placed in a weigh feeder in step 120 for feeding into a kiln. In step 130, the dry spheroids are mixed with a parting agent which is typically aluminum oxide. The functions of the parting agent are to (1) prevent the dry spheroids from clustering together or adhering to the kiln wall during firing, (2) provide improved strength, (3) control surface electrical charge, (4) control surface roughness and abrasiveness, and (5) provide improved chemical resistance. Aluminum oxide and magnesium oxide have proven useful in performing the process of the present invention.

The next step (140) is to feed, typically by means of a screw feeder, the mixture of parting agent and dry spheroids to a rotary kiln. A rotary kiln is the preferred apparatus for this step. The residence time of the spheroids in a rotary kiln is dependent upon several parameters: Kiln length, diameter, angle, and rotational speed, feed rate to the kiln, temperature within the kiln, gas atmosphere, and diameter of the spheroids. Residence time and temperature are adjusted to achieve the desired properties. With a typical residence time in a rotary kiln of twenty to thirty minutes, with a longer time for more coarse media, increasing the kiln temperature results in decreasing fired density of the spheroids. Firing temperature is typically 1080 to 1200° C.

The clay spheroids are overfired, which allows for the formation of internal air cells, making the finished product less dense. The firing atmosphere is air. It is believed that organic matter in the clay break down into gaseous components during firing to form the internal air cells. The process of the present invention can produce spheroids having specific gravity ranging from 0.2 to 2.0 grams per cubic centimeter, however variations in process parameters may result in spheroids having specific gravities outside the stated range.

Some of the metal oxide parting agent may become part of the spheroids during the firing step. Higher firing temperatures result in a thicker shell of parting agent on the spheroids. The coarser the particle size of the mineral particulate in the composition, the higher the required temperature, and more metal oxide is absorbed into the spheroids during firing to form an outer shell rich in metal oxide concentration. Also, finer particle size distribution of the parting agent allows more metal oxide to be absorbed into the spheroids.

In step 150, the product from the kiln is screened. The spheroids of the present invention, have a final particle size, for example, of 20/40 and 30/50, which means that all spheroids have a size ranging from 20 to 40 mesh and 30 to 50 mesh, respectively. The spheroid size fraction is not larger than about one-half inch. In step 160, on sized fired spheroids are stored in bulk bags while spheroids sized 80 mesh or smaller are sent to waste.

Either before, during or after the screening step, the fired spheroids may be subjected to vigorous agitation by air or some other agitation means or to a water washing step in order to remove dust from their surfaces.

In an alternative embodiment, the above described clay is used an expanding agent, the clay is mixed with mineral particulates such as nypheline syenite or Silicon sand to form spheroids which are then dried and sized. Depending on the reduction in bulk density desired, the percentage of clay ranges from 10% to 80% by weight. The dried spheroids are then processed according to steps described in the process for making clay spheroids 100.

EXPERIMENTAL RESULTS

Example 1

Dry raw spheroids of clay were obtained from the Hallock deposit in Kittson County, Minn. in the size ranges of $-\frac{5}{16}$ mesh +6 mesh, –6 mesh +10 mesh, –18 mesh +50 mesh, –45 mesh +60 mesh, –60 mesh +80 mesh. The dry raw spheroids were fed into a 4'×40' internal fired kiln at a rate of 1500 pounds per hour. The spheroids in the kiln were fired at 1080° C. with a retention time of about 20 minutes. Calcined or hydrated alumina powder at a rate of 20% was fed with the spheroids to assist as a parting agent to reduce products from agglomerating or sintering. The fired spheroids from the kiln discharge were cooled and screened into –0.5 inch mesh +3.5 mesh, –3.5 mesh +7 mesh, –7 mesh +14 mesh, –14 mesh +30 mesh, –30 mesh +50 mesh, –40 mesh +60 mesh, and –60 mesh to +80 mesh. The bulk density of the fired spheroids ranged from 10 pounds per cubic foot to 50 pounds per cubic foot. The spheroids having bulk densities between 10 and 25 pounds per cubic foot floated on water.

Figure 2A:
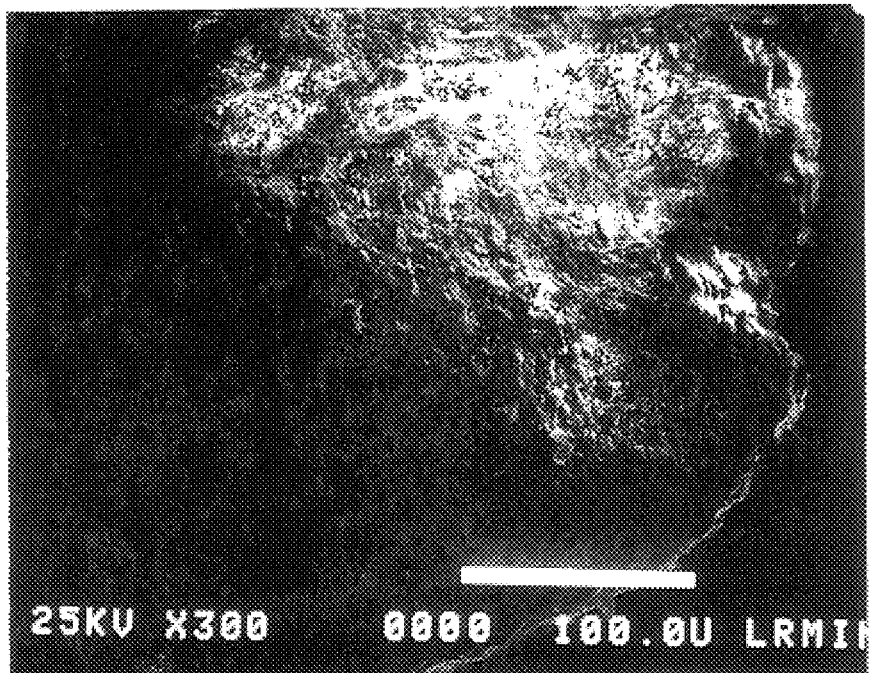
FIGS. 2A and 2B illustrate clay spheroids made in accordance with the present invention.
Figure 2B:
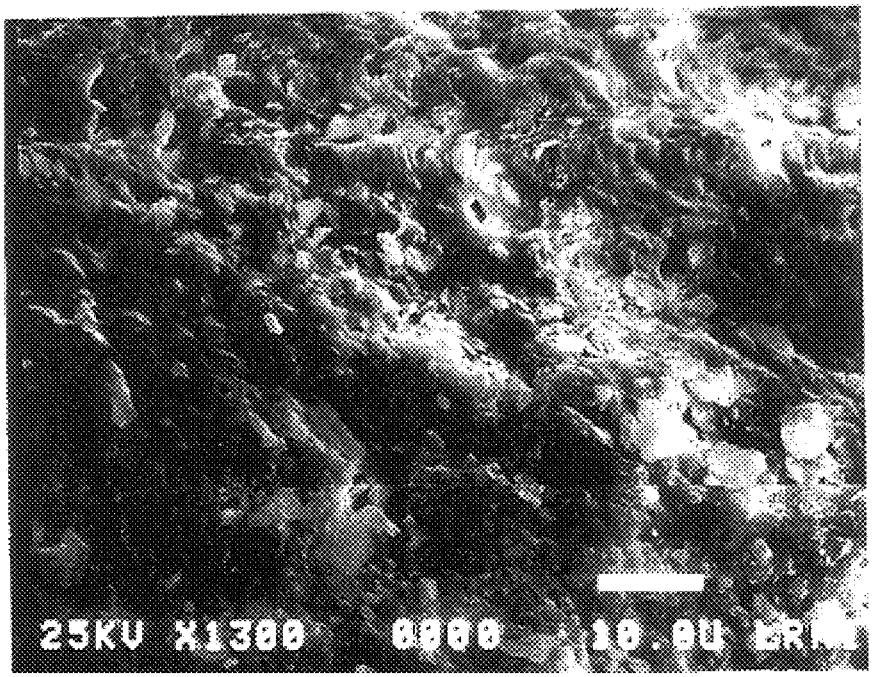

The scanning electron photomicrographs of FIGS. 2A and 2B depict outside views of the ceramic spheroids of Example 1. FIG. 2A shows the irregular spheroid and FIG. 2B shows the consistent, textured surface that resulted from the above described procedure. The bumps, grooves, craters, etc. show the large amount of surface area provided compared to a completely round and smooth sphere. The physical properties of the resultant spheroids include a specific gravity of between 0.2 to 2.0 grams per cubic centimeter and a bulk density of between 10 and 70 pounds per cubic foot. The crush strength of the resultants spheroids appear to similar to that of spheroids of comparable size such as Macrolite®. The textured surface is suitable for filtration and biosupport including bioremediation applications in which it is desirable for the spheroid to be capable of growing and supporting a biofilm without significantly impeding flow through the system.

Example 2

A dry –100 mesh Kittson clay mix of 50% was added to 50% Silicon sand and blended in an Eirich mixer model RV02 with the cylindrical container rotating at 66 RPM and the impacting impeller rotating a 2,230 RPM for a period of 5 minutes. Then 17% water additions were added over a period of 30 seconds. After the mixer ran for 10 minutes, the impacting impeller speed was reduced to 1,115 RPM for an additional 10 minutes (build up time) after which the unit was stopped.

The batch was dried over night at 200 F. The dried spheroids were screened to obtain 3.5/7 mesh fraction. Then 200 grams of unfired spheroids were mixed with 20 grams of alumina powder.

The mixture was fed into a batch vycore roasting drum (batch unit) and fired for 18 minutes at 1080 C, air cooled, and tested for bulk densities. Bulk density of the feed material indicated 67.16 pounds per cubic foot, fired product reduced weight to 47.88 pounds per cubic foot with a weigh loss of 19.28 pounds per cubic foot or a 28.71 percent reduction in bulk density.

The preferred embodiments of the invention have been illustrated and are described in detail. However, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

I claim:

1. A process of making ceramic spheroids comprising the steps of:

obtaining wet clay that is substantially free of silicon carbide comprising by weight percent: FeO (3.22–4.84), $Fe_3O_4$ (3.40–5.11), S (0.16–0.29), Organic C (0.26–1.04);

forming wet clay spheroids from the wet clay;

drying the wet clay spheroids; and firing the dried clay spheroids in contact with a parting agent at a sufficiently high temperature and for a sufficiently long time to form a shell and to decrease an initial unfired bulk density of the spheroids to a predetermined fired bulk density.

2. The process of claim 1 wherein said clay spheroids comprise the following by weight percent: $SiO_2$ (52.49–55.69), CaO (2.89–6.74), MgO (3.21–4.69), $Al_2O_3$ (11.91–17.65), $TlO_2$ (0.58–0.71), MnO (0.07–0.11), $Na_2O$ (0.47–0.86), $K_2O$ (1.99–2.37), $P_2O_3$ (0.13–0.19), $CO_2$ (1.80–6.23), $H_2O+$ (4.14–7.28), $H_2O-$ (2.12–5.48).

3. The process of claim 1 wherein the fired ceramic spheroids have a fired bulk density ranging between ten to fifty pounds per cubic foot.

4. The process of claim 1 wherein the firing temperature is between 1080° C. and 1200° C.

5. The process of claim 1 wherein said parting agent comprises a particulate selected from aluminum oxide, magnesium oxide, and their precursors.

6. A process of making ceramic spheroids comprising the steps of:

obtaining wet clay that is substantially free of silicon carbide comprising by weight percent: FeO (3.22–4.84), $Fe_3O_4$ (3.40–5.11), S (0.16–0.29), Organic C (0.26–1.04), $SiO_2$ (52.49–55.69), CaO (2.89–6.74), MgO (3.21–4.69), $Al_2O_3$ (11.91–17.65), $TlO_2$ (0.58–0.71), MnO (0.07–0.11), $Na_2O$ (0.47–0.86), $K_2O$ (1.99–2.37), $P_2O_3$ (0.13–0.19), $CO_2$ (1.80–6.23), $H_2O+$ (4.14–7.28), $H_2O-$ (2.12–5.48);

forming wet clay spheroids from the wet clay;

drying the wet day spheroids; and firing the dried clay spheroids in contact with a parting agent comprising a particulate selected from aluminum oxide, magnesium oxide, and their precursors at a firing temperature between 1080° C. and 1200° C. for a sufficiently long time to form a shell and to decrease an initial unfired bulk density of the spheroids to a fired bulk density of between ten to fifty pounds per cubic foot.

7. A process of making ceramic spheroids comprising the steps of:

mixing and converting to spheroids, with the aid of water, 10 to 80 parts by weight of a clay that is substantially free of silicon carbide comprising by weight percent: FeO (3.22–4.84), $Fe_3O_4$ (3.40–5.11), S (0.16–0.29), Organic C (0.26–1.04), $SiO_2$ (52.49–55.69), CaO (2.89–6.74), MgO (3.21–4.69), $Al_2O_3$ (11.91–17.65), $TlO_2$ (0.58–0.71), MnO (0.07–0.11), $Na_2O$ (0.47–0.86), $K_2O$ (1.99–2.37), $P_2O_3$ (0.13–0.19), $CO_2$ (1.80–6.23), $H_2O+$ (4.14–7.28), $H_2O-$ (2.12–5.48) and 20 to 90 parts by weight of a mineral particulate;

drying the spheroids;

and firing said spheroids in contact with a parting agent comprising a particulate selected from aluminum oxide, magnesium oxide, and their precursors at a firing temperature between 1080° C. and 1200° C. for a sufficiently long time to form a shell and to decrease an initial unfired bulk density of the spheroids to a fired bulk density of between ten to fifty pounds per cubic foot.

8. The method of claim 7 wherein said mineral particulate comprises Silicon sand.

9. Fired ceramic spheroids made from clay that is substantially free of silicon carbide comprising by weight percent: FeO (3.22–4.84), $Fe_3O_4$ (3.40–5.11), S (0.16–0.29), Organic C (0.26–1.04); wherein said spheroids have been fired in contact with a parting agent at a sufficiently high temperature and for a sufficiently long time to form a shell and to reduce an initial unfired bulk density to a predetermined fired bulk density.

10. The spheroids of claim 9 comprising the following by weight percent: $SiO_2$ (52.49–55.69), CaO (2.89–6.74), MgO (3.21–4.69), $Al_2O_3$ (11.91–17.65), $TlO_2$ (0.58–0.71), MnO (0.07–0.11), $Na_2O$ (0.47–0.86), $K_2O$ (1.99–2.37), $P_2O_3$ (0.13–0.19), $CO_2$ (1.80–6.23), $H_2O+$ (4.14–7.28), $H_2O-$ (2.12–5.48).

11. The spheroids of claim 9 wherein said spheroids have a fired bulk density of between ten to fifty pounds per cubic foot.

12. The spheroids of claim 9 wherein the firing temperature is between 1080° C. and 1200° C.

13. The spheroids of claim 9 wherein said parting agent comprises a particulate selected from aluminum oxide, magnesium oxide, and their precursors.

14. Fired ceramic spheroids made from clay that is substantially free of silicon carbide comprising by weight percent: FeO (3.22–4.84), $Fe_3O_4$ (3.40–5.11), S (0.16–0.29), Organic C (0.26–1.04), $SiO_2$ (52.49–55.69), CaO (2.89–6.74), MgO (3.21–4.69), $Al_2O_3$ (11.91–17.65), $TlO_2$ (0.58–0.71), MnO (0.07–0.11), $Na_2O$ (0.47–0.86), $K_2O$ (1.99–2.37), $P_2O_3$ (0.13–0.19), $CO_2$ (1.80–6.23), $H_2O+$ (4.14–7.28), $H_2O-$ (2.12–5.48); wherein said clay is fired in contact with a parting agent comprising a particulate selected from aluminum oxide, magnesium oxide, and their precursors at a firing temperature between 1080° C. and 1200° C. for a sufficiently long time to form a shell; and wherein the fired ceramic spheroids have a fired bulk density of between ten to fifty pounds per cubic foot.

15. Fired ceramic spheroids comprising: (a) 10 to 80 parts be weight of a clay that is substantially free of silicon carbide comprising by weight percent: FeO (3.22–4.84), $Fe_3O_4$ (3.40–5.11), S (0.16–0.29), Organic C (0.26–1.04), $SiO_2$ (52.49–55.69), CaO (2.89–6.74), MgO (3.21–4.69), $Al_2O_3$ (11.91–17.65), $TlO_2$ (0.58–0.71), MnO (0.07–0.11), $Na_2O$ (0.47–0.86), $K_2O$ (1.99–2.37), $P_2O_3$ (0.13–0.19), $CO_2$ (1.80–6.23), $H_2O+$ (4.14–7.28), $H_2O-$ (2.12–5.48); and (b) 20 to 90 parts by weight of a mineral particulate; wherein said spheroids are fired in contact with a parting agent comprising a particulate selected from aluminum oxide, magnesium oxide, and their precursors at a firing temperature between 1080° C. and 1200° C. for a sufficiently long time to form a shell; and wherein the fired ceramic spheroids have a fired bulk density of between ten to fifty pounds per cubic foot.

16. The ceramic spheroids of claim 15 wherein said mineral particulate comprises Silicon sand.

* * * * *